2 Sheets—Sheet 1.

G. P. RISHEL.

Assignor of one-half to T. B. WELCH & SON.

VULCANIZING AND CELLULOID APPARATUS.

No. 10,442. Reissued Jan. 29, 1884.

Witnesses.
Robert Everett,
J. A. Rutherford

Inventor.
George P. Rishel,
By James L. Norris.
Atty.

N. PETERS, Photo-Lithographer, Washington, D. C.

2 Sheets—Sheet 2.

G. P. RISHEL.

Assignor of one-half to T. B. WELCH & SON.

VULCANIZING AND CELLULOID APPARATUS.

No. 10,442. Reissued Jan. 29, 1884.

Witnesses.
Robert Everett.
J. A. Rutherford

Inventor.
George P. Rishel.
By
James L. Norris.
Atty.

N. PETERS, Photo-Lithographer, Washington, D. C.

UNITED STATES PATENT OFFICE.

GEORGE P. RISHEL, OF HORNELLSVILLE, N. Y., ASSIGNOR OF ONE-HALF TO THOMAS B. WELCH & SON, OF PHILADELPHIA, PA.

VULCANIZING AND CELLULOID APPARATUS.

SPECIFICATION forming part of Reissued Letters Patent No. 10,442, dated January 29, 1884.

Original No. 287,723, dated October 30, 1883. Application for reissue filed December 11, 1883.

*To all whom it may concern:*

Be it known that I, GEORGE P. RISHEL, a citizen of the United States, residing at Hornellsville, in the county of Steuben and State of New York, have invented certain new and useful Improvements in Vulcanizing and Celluloid Apparatus, of which the following is a specification.

This invention relates to improvements in vulcanizing and celluloid apparatus; and it has for its objects to provide an apparatus of novel construction, more especially designed for dental use, wherein steam is generated for the treatment of rubber in flasks or molds; to provide novel means for pressing and closing the flasks or molds; to provide means whereby the steam within the inner chamber or piston-cylinder can escape as the latter moves to press the flasks or molds, thus relieving the steam-pressure, obtaining the full or complete stroke of the piston-cylinder, and insuring perfectly-closed flasks; to provide means for locking the inner chamber or piston-cylinder at the completion of its stroke or after the flasks have been closed by pressure; to permit the flasks to be cooled in such position; and, finally, to improve the general construction of the parts. The above-mentioned objects are accomplished in an efficient manner by the means hereinafter described and claimed, reference being had to the accompanying drawings, in which—

Figure 1:
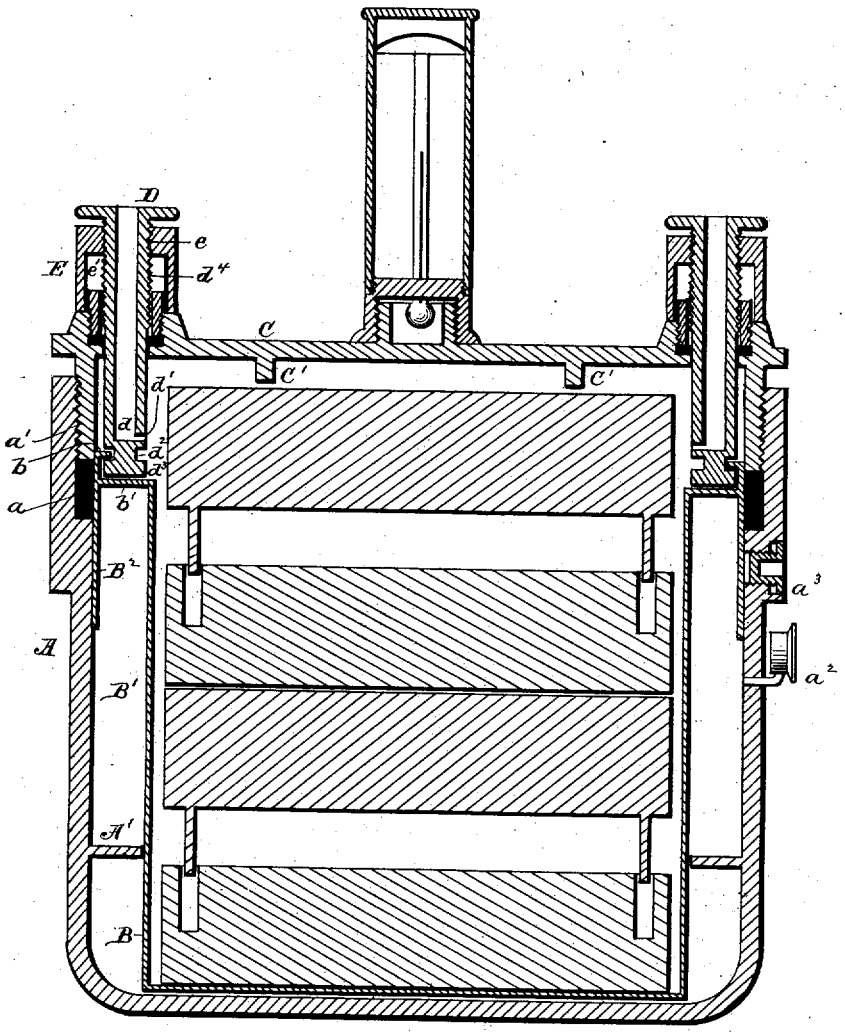
Figure 2:
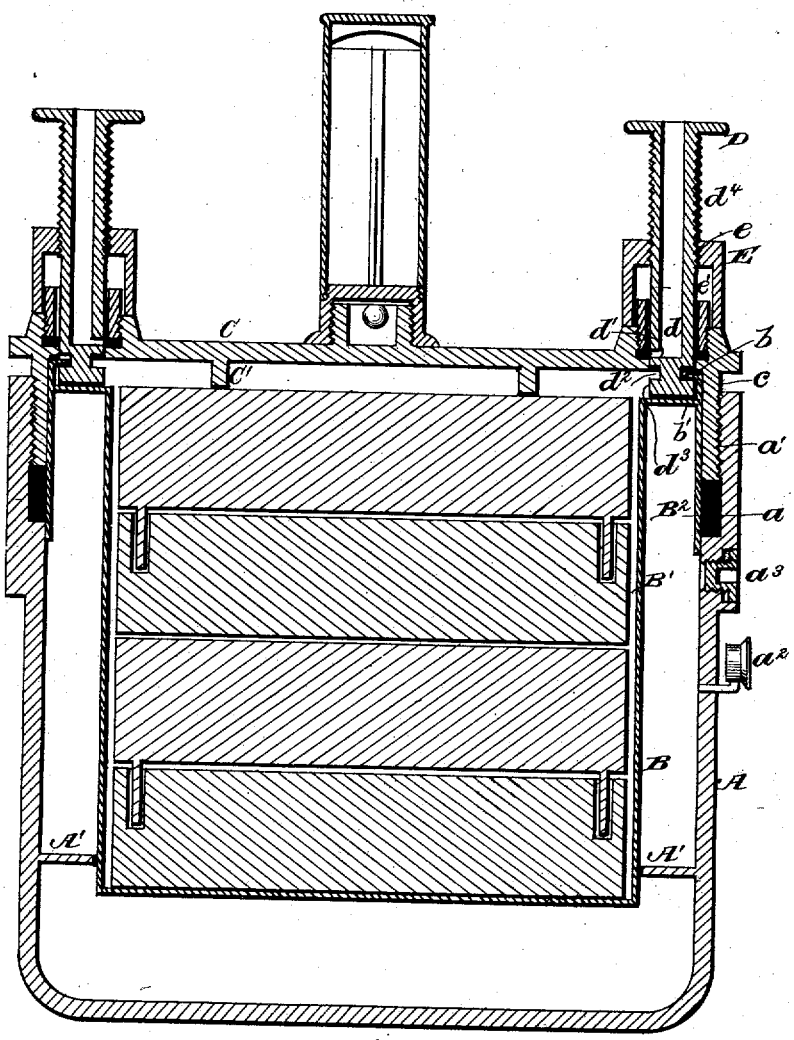
Figure 3:
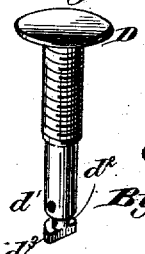

Figure 1 is a central vertical section with the flasks in position and the apparatus ready for heat to be applied. Fig. 2 is a similar view, showing the flasks closed, the inner cylinder at the end of the upstroke and locked. Fig. 3 is a perspective view of a detail.

Referring to the drawings, in which similar letters of reference indicate like parts in all the figures, A indicates the exterior cylinder, which, for convenience, will be hereinafter designated as the "boiler-cylinder," and B the inner chamber or cylinder, which, for the same reason, I will hereinafter designate the "piston-cylinder." The boiler-cylinder A, near its upper extremity, is of increased diameter, to form a packing-chamber, *a*, and has an interior threaded portion, *a'*, which engages a threaded annular flange, *c*, upon the cap C. As the cap C is screwed down into the boiler-cylinder, the annular flange *c* compresses the interposed packing in the chamber *a* and makes a steam-tight joint.

Formed upon the inner surface of the boiler-cylinder is a horizontal annular flange, A', which serves as a guide to the piston-cylinder B, which moves therein. The boiler-cylinder is provided with a suitable steam-gage, $a^2$, and blow-off $a^3$, for purposes which will be obvious.

The piston-cylinder B has a closed bottom, and is composed of a main cylindrical portion, B', which operates within the annular flange A', and a larger cylindrical portion, $B^2$, which is of slightly smaller diameter than the interior of the boiler-cylinder A, and covers the packing-chamber *a*. From the upper edge of this portion $B^2$ a flange, *b*, projects inward, and parallel with this flange *b* is the web *b'*, which connects the portions B' and $B^2$ of the piston-cylinder.

In the operation of the apparatus the boiler-cylinder and its cover or cap remain stationary, while the inner chamber or piston-cylinder with its closed bottom moves upward, and therefore provision is made by me whereby the steam and air can escape from the interior of the inner chamber or piston-cylinder. This I accomplish by providing suitable means—such as a passage or exit—in such manner that as the inner chamber or piston-cylinder moves to press the flasks, the steam can escape from the said chamber or cylinder through the passage or exit, thus relieving the pressure and obtaining the complete or full stroke of the piston with absolute certainty of closed flasks.

As shown in the drawings, the specific means employed by me for effecting the escape of steam above alluded to consists in two metal bolts, D, which pass through proper apertures in the cap C, each having a central longitudinal passage extending from the top to a point near the lower end thereof, as seen at *d*, and thence at right angles thereto, as seen at *d'*, to connect with the interior space between the piston-cylinder B and the cap C. The passage *d d'* in the bolt D will, it will be observed, connect with the outer air until the passage *d'* passes into the packing of the aperture in the cap C, through which the bolt passes, which will only occur when the cylinder is at or near the end of its upstroke, and further escape through the passages $d$ $d'$ is not needed.

Below the channel or passage $d'$ each bolt D is solid, and has a cylindrical neck or shank, $d^2$, and a locking-plate, $d^3$, all formed in a single piece. In one position the plate $d^3$ will pass readily by the flange $b$ when a quarter turn—that is to say, one-fourth of a revolution—will bring said plate under the flange $b$, between it and the web $b'$, and securely lock the parts D and B together.

The bolt D is provided with internal threads, $d^4$, which engage the threads $e$ of a nut, E. This nut has a central chamber, $e'$, and its lower edge finds a seat upon the cap C, as shown. By this means, when the piston-cylinder has completed its upstroke, the flasks are closed and the heat discontinued. The parts may be locked by screwing this nut E down upon its seat until the cooling process is effected.

In this act an even uniform temperature throughout the flask is not only desirable, but, to secure good results, necessary. In my construction the piston-cylinder gives the uniform heat of the boiler to bottom and sides of the flasks, and to provide for the same temperature over the tops of the flasks I provide the cap C with downwardly-extending projections C', which form a bearing for the upper surface of the flasks. It will therefore be observed that the heat may circulate over the tops of the flasks, and that the stroke of the inner or piston cylinder may extend above the top of the boiler-cylinder and higher than the horizontal plane of the flasks. This is an important step in the art, and comprises an important feature in this invention. The steam as it generates imparts heat to the material being cured, and the gradual increase of pressure elevates the piston-cylinder. Hence, in the first stages in the generation of steam no steam-exit is required. For this reason I locate the blow-off $a^3$ in the boiler-cylinder opposite the cylinder $B^2$ of the piston-cylinder, as the steam-pressure will never require reduction until the said cylinder $B^2$ has uncovered the blow-off $a^3$.

Modifications in details of construction may be made without departing from the principle or sacrificing the advantages of my invention, the essential features of which will be readily understood from the foregoing description, taken in connection with the drawings.

Having thus described my invention, what I claim is—

1. In a vulcanizing and celluloid apparatus, two concentric cylinders, and a cap secured to the outer cylinder to form a steam-tight joint, the space between the two cylinders being formed into a boiler, and the inner cylinder being adapted to serve as a piston to press the material between its closed bottom and the cap as it is impelled by the steam generated in the boiler, combined with means for automatically allowing egress of gas, &c., from the inner chamber, substantially as described.

2. In a vulcanizing apparatus, the combination, with an inner chamber or piston-cylinder for pressing the flasks or molds, of a suitable steam-escape for the steam in the inner chamber or piston-cylinder, for relieving the pressure and obtaining the full stroke of the piston to insure closed flasks.

3. In a vulcanizing apparatus having an inner movable chamber or piston-cylinder for containing and pressing the flasks or molds, a passage or exit permitting the escape of steam to relieve the steam-pressure and obtain the full stroke of the chamber or piston-cylinder, thereby insuring closed flasks.

4. A vulcanizing apparatus having a steam-escape from the inner chamber or piston-cylinder, for relieving pressure, obtaining the full stroke of the piston-cylinder, and insuring closed flasks.

5. In a vulcanizing apparatus such as described, means whereby steam escapes from the inner chamber or piston-cylinder as the latter moves to press the flasks, for obtaining the full stroke of the chamber or piston-cylinder and insuring closed flasks.

6. The combination, in a vulcanizing apparatus, of an outer cylinder, an inner piston-cylinder moved by generated steam to press the flasks, and means for permitting the escape of steam as the piston-cylinder moves to press the flasks, for obtaining the full stroke of the piston-cylinder and insuring closed flasks.

7. In a vulcanizing and celluloid apparatus, and in combination with the cylinder A, having guide-flange A', and the cap C, the piston-cylinder B, composed of the portions B' and $B^2$, and the web $b'$, as and for the purpose set forth.

8. In a vulcanizing apparatus as described, a hollow locking-bolt connecting the interior of the piston-cylinder with the outer air, combined with such piston-cylinder, and adapted to serve substantially as set forth.

9. In combination with the cylinder B, having flange $b$, the bolt D, having passages $d$ $d'$, and plate $d^3$, and the cap C, as set forth.

10. In combination with the piston-cylinder, the cap, and the bolt D, the nut E, adapted to lock the cap and piston together, as set forth.

11. In a vulcanizing and celluloid apparatus substantially as described, the cap C, having projections C', whereby the stroke of the piston may exceed the height of the flasks, as set forth, for the purposes described.

12. The combination of the boiler-cylinder A, having blow-off $a^3$, located as described, and the piston having cylindrical portion $B^2$, as set forth.

13. In combination with the boiler A, having packing-chamber $a$ and guide-ring A', the piston-cylinder B, as shown, the cap C, having projection C′ and flange *e*, and blow-off *a*⁵, as set forth.

14. In combination with the boiler-cylinder, piston-cylinder, and cap, as described, the bolt D, and locking-nut E, as shown, all adapted to serve as and for the purpose set forth.

In testimony whereof I have signed my name to this specification before two subscribing witnesses.

GEO. P. RISHEL.

Witnesses:
WM. C. BINGHAM,
H. HOLLIDAY.